W. EVANS.
TRIMMING MACHINE.
APPLICATION FILED JAN. 13, 1916.

1,247,651.

Patented Nov. 27, 1917.
6 SHEETS—SHEET 1.

WITNESSES

INVENTOR
William Evans.
BY
ATTORNEYS

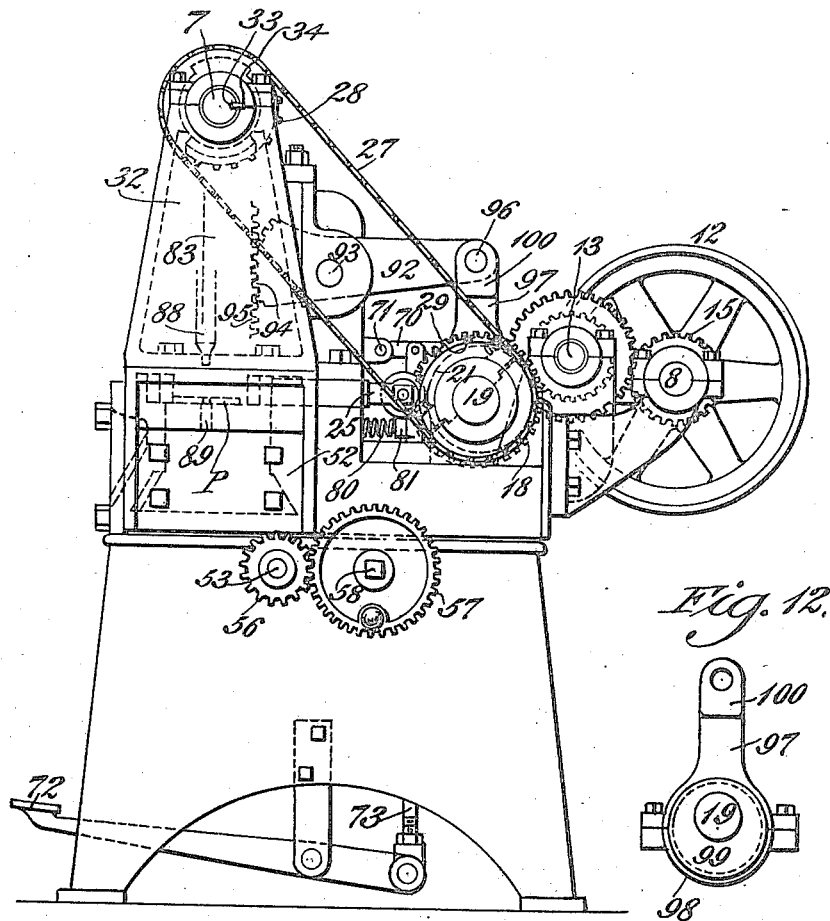

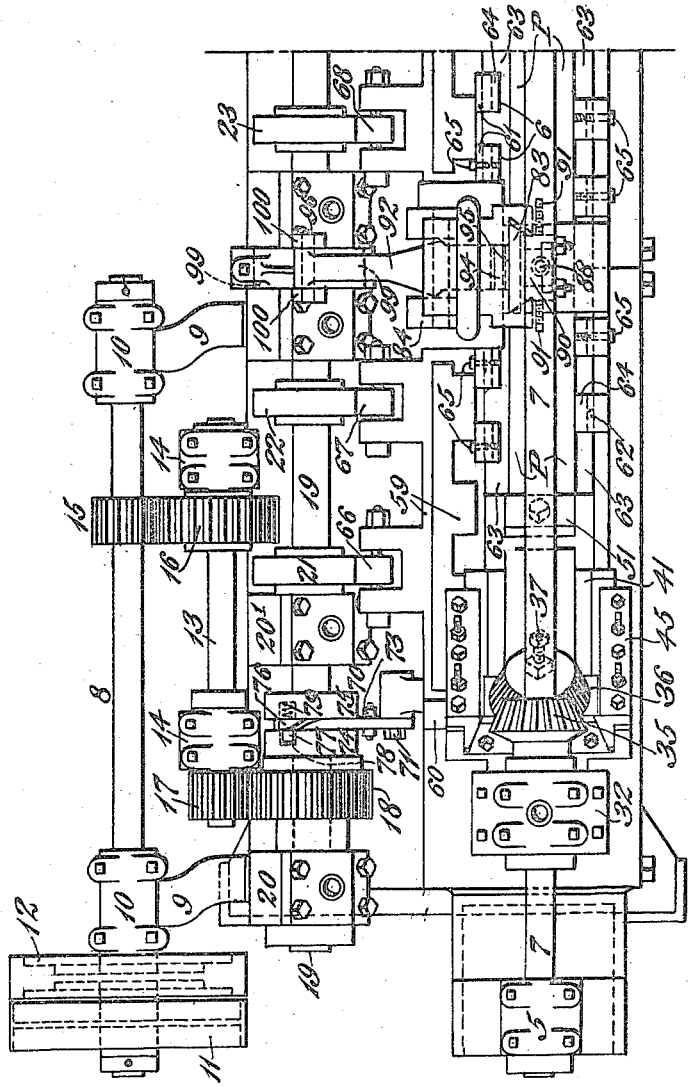

W. EVANS.
TRIMMING MACHINE.
APPLICATION FILED JAN. 13, 1916.
1,247,651.
Patented Nov. 27, 1917.
6 SHEETS—SHEET 5.
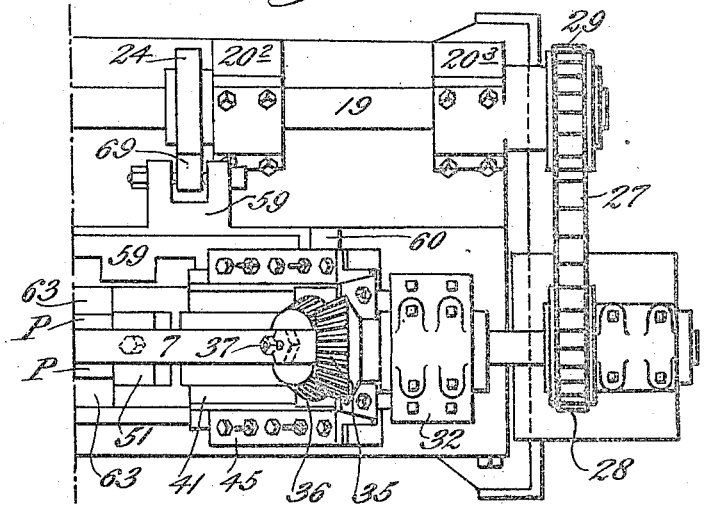
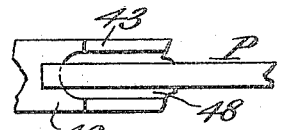
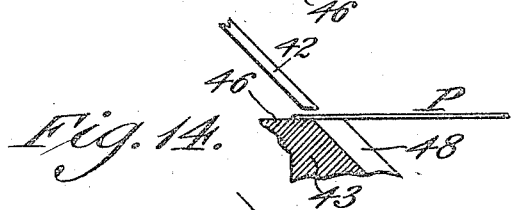
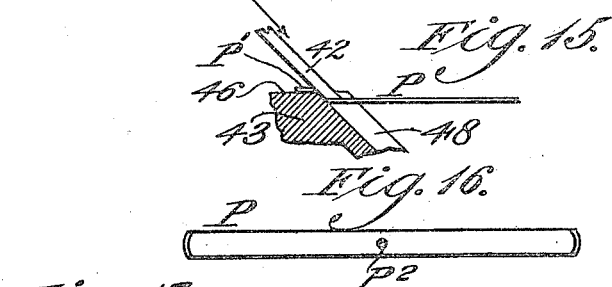
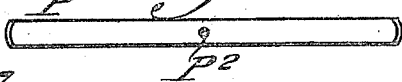

W. EVANS.
TRIMMING MACHINE.
APPLICATION FILED JAN. 13, 1916.

1,247,651.

Patented Nov. 27, 1917.
6 SHEETS—SHEET 6.

WITNESSES
L. Douville,
H. T. Dieterich

INVENTOR
William Evans,
BY Niedersheim & Fairbanks
ATTORNEYS though they are not intended to be so positioned upon the base or supporting structure for the machine, but to be separated by the interposition of the operating mechanism which is substantially the same as that shown in my aforesaid patent No. 1,164,337, and which therefore is not herein repeated.

UNITED STATES PATENT OFFICE.

WILLIAM EVANS, OF OAK LANE, PENNSYLVANIA, ASSIGNOR TO THE FIRM OF JOHN EVANS' SONS, OF PHILADELPHIA, PENNSYLVANIA, COMPOSED OF WILLIAM EVANS, ROBERT EVANS, AND JOHN H. EVANS.

TRIMMING-MACHINE.

1,247,651. Specification of Letters Patent. Patented Nov. 27, 1917.

Original application filed September 13, 1915, Serial No. 50,414. Divided and this application filed January 13, 1916. Serial No. 71,873.

*To all whom it may concern:*

Be it known that I, WILLIAM EVANS, a citizen of the United States, residing at Oak Lane, in the county of Montgomery, State of Pennsylvania, have invented a new and useful Trimming-Machine, of which the following is a specification.

My invention relates, primarily, to the art of manufacturing vehicle springs and particularly to that art in so far as it is concerned with the making of heavy springs of high-grade steel for use in vehicles of the general type of automobiles and trucks.

It comprehends, primarily, a machine for trimming both of the ends of the bars, leaves or plates of which elliptical springs are composed, so as to give each end a rounded edge contour.

In United States Letters Patent No. 1,164,337, granted to me under date of December 14, 1915, I have referred to the fact that in the manufacture of the plates of springs as theretofore conducted, it had been both customary and necessary to draw the ends of the spring plates to a taper and to then trim their points or ends to a desired shape, varying, of course, with the character of the spring.

In the operation of the machine of said patent, there is accomplished such a trimming or treatment of a metal bar as gives to first one of its ends and then to the other, an outline and a rounding or beveling of the ends so outlined.

In my present invention I perform the same operation simultaneously upon both ends of the bar and by essentially,—so far as coacting cutters, plates or dies, one of which is movable and the other of which is fixed, are concerned,—the same assemblage of dies, only in my present machine in duplicate and in relatively adjustable relationship.

My especial object being as above indicated, my invention comprehends an organized machine in which are assembled a preferably duplicate pair of relatively and oppositely adjustable coacting cutters, one of which is movable relatively to the other, and both of which pairs are oppositely disposed and differentially movable,—and in which are embodied such prime-moving and connective mechanism as, under the control of the operator, will effect the desired operation of said coacting cutters,—the machine as an entirety being provided with means for the relative adjustment of said coacting cutters prior to their being thrown into action.

The punching mechanism which coacts with the cutting mechanism and punches holes through, or forms studs in, the bars or plates at any point between their ends, and also the mechanism which straightens the bar in case it should have become warped in the heating,—which I represent in the accompanying drawings and hereinafter describe, form no part of the invention of this application and are not claimed herein, because said mechanisms combined with the cutting mechanism and connections *per se* which form the subject-matter of this application, are comprehended and claimed in United States Letters Patent, No. 1,205,179, granted to me as assignor to John Evans' Sons on November 21st, 1916.

Although I prefer a machine of the special organization represented and described, I regard it as typifying merely an organized machine adapted for the purpose recited, and my invention in its details comprehends specific constructions represented and described, and hereinafter specifically claimed.

For the purpose of illustrating my invention, I have shown in the accompanying drawings a certain type and embodiment of it which is at present preferred by me, because in practice it will give satisfactory and reliable results.

It is to be understood, however, that the various instrumentalities of which my invention consists can be variously arranged and organized, and that my invention is not. therefore, limited to the precise arrangement and organization of these instrumentalities as herein shown and described.

In the accompanying drawings—

Figures 1 and 2 together represent a side elevation of a trimming machine embodying my invention, all of the parts being shown in the positions which they occupy before they are brought into action.

Fig. 3 represents an end elevation of the machine viewed from the right-hand sides or ends of Figs. 2 and 5.

Figs. 4 and 5 together represent a plan of the entire machine.

Fig. 12 represents a section of the cam shaft and eccentric which occasion the operation of the rocker of the rack and segment gear which operates the punching die.

Fig. 13 represents a fragmentary detail of the plate or bar to be operated upon, laid upon a fixed cutter.

Figure 1:
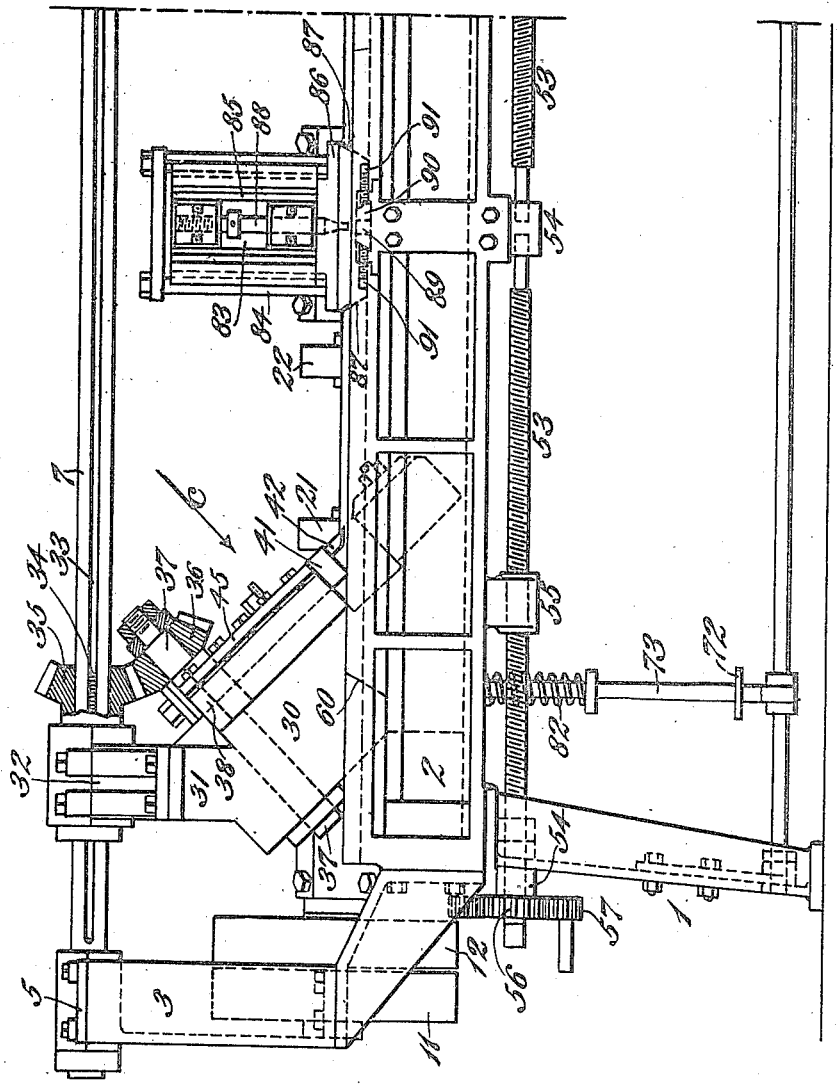

Figs. 14 and 15 respectively represent fragmentary details of a fixed and a movable cutter and of the plate or bar to be acted upon, in the positions which said plate or bar occupies, in Fig. 14, before the action of the dies and, in Fig. 15, after their action.

Fig. 16 represents a plan and Fig. 17 a longitudinal section of a plate or bar after it has been operated upon to trim its ends and punch a hole through it.

Fig. 18 represents a longitudinal section of a bar after it has been struck with a nibbing die instead of a punch.

Similar numerals of reference indicate corresponding parts.

Referring to the drawings:—

1 designates the base frame-work of the machine, of any preferred formation but preferably of the form of end standards which support a longitudinally extending table or carrying frame 2, from the opposite ends of which spring stands 3 and 4, provided with bearings 5 and 6.

*The prime-moving and connective mechanism.*

7 designates a gear shaft journaled in the bearings 5 and 6, the rotation of which, as hereinafter explained, occasions the rotation of the driven bevel pinions of each pair of the movable cutter dies.

8 designates the main driving shaft supported upon carrying brackets 9 springing from the rear of the table frame, and provided with bearings 10 for said driving shaft.

Power is imparted to the main driving shaft by a tight pulley 11,—a loose pulley 12 being also preferably keyed to said shaft. 13 designates a counter shaft supported in bearings 14 upon the table frame, and driven through the spur pinion 15 and spur wheel 16.

This counter shaft, through the spur pinion 17 and the spur wheel 18, in turn drives the cam shaft 19, which cam shaft is supported in the bearings 20, 20′, 20², 20³ upon the frame, and carries the cams 21, 22, 23 and 24 which together operate the bar-straightening frame 59, which travels in frameways 60 on the table frame, as hereinafter explained.

The cam shaft, driven as described, is divided into two members between the bearings 20 and 20′, and provided with a clutch hereinafter described, and drives the gear shaft 7, conveniently by means of a sprocket chain 27 traveling upon a sprocket wheel 28 on said gear shaft and a sprocket wheel 29 on the cam shaft 19.

Such being a convenient prime-moving and connective mechanism between the main driving shaft 8 and the cam shaft 19 which operates both the bar-straightening mechanism and the punching or nibbing mechanism, and also the gear shaft 7 which operates the cutting and trimming mechanism,—the organization of these special mechanisms is as follows:—

*The bar cutting and trimming mechanism.*

As already explained, in my present invention I use in duplicate a preferably oppositely counterpart assemblage of the cutting mechanisms of the machine which forms the subject-matter of my application for patent referred to, and it is therefore unnecessary in this application to describe more than one of said mechanisms, or to apply to them in the drawings and herein other than duplicate numerals.

Each of the bar cutting and trimming mechanisms is carried upon a movable head 30, being a casting or framing preferably disposed at an angle of 45° with reference to the plane of the top of the table or carrying frame 2.

Figure 6:
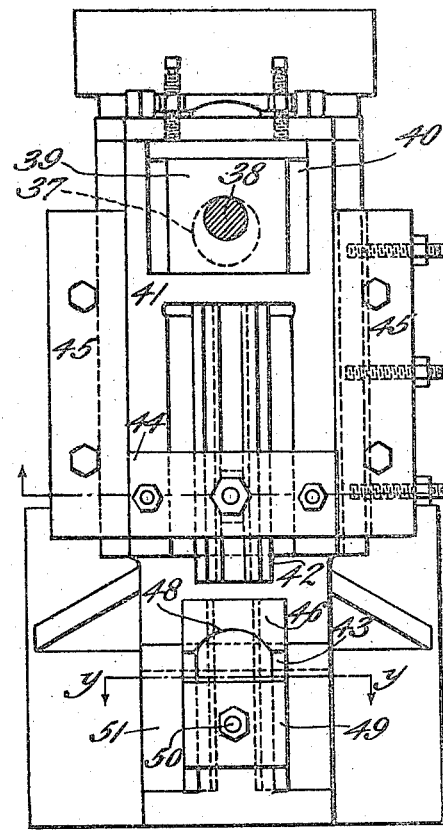
Fig. 6 represents the upper or outer surface of one of the cutting and trimming mechanisms of my machine, the view being taken in the direction of the arrow *c* upon Fig. 1, and the parts being in the position represented in said figure,—that is to say, with the two cutters of one of the pairs of cutters, separated.
Figure 8:
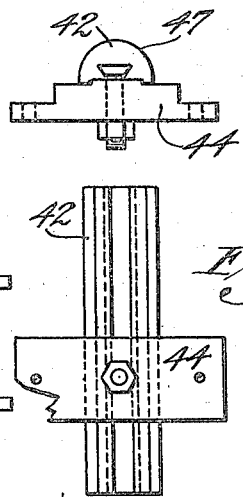
Fig. 8 represents in end elevation and viewed from above, the moving cutter shown in Fig. 9.
Figure 9:
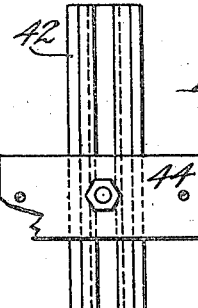
Fig. 9 represents in plan said moving cutter removed from its frame.
Figure 10:
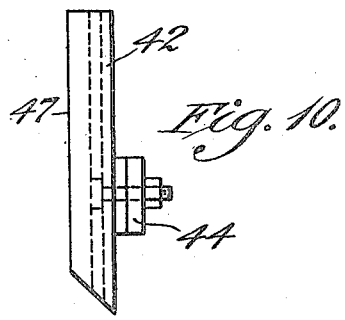
Fig. 10 represents in side elevation the cutter represented in Figs. 8 and 9.
Figure 7:
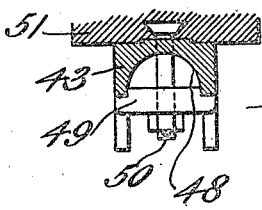
Fig. 7 represents in transverse section on the dotted line *y—y* of Fig. 6, one of the fixed cutters.

The head is extended upwardly in the form of a bracket 31 crowned with a splined bearing 32 through which is journaled one end portion of the gear shaft 7 which is formed with a spline-way 33 for the spline 34 of a driving bevel-pinion 35 which meshes with a driven bevel pinion 36 fixed on a driven shaft 37 suitably journaled within the movable head 30. The driven shaft is formed with a wrist pin 38 (Figs. 1, 2 and 6) which passes through and, in the rotation of the driven shaft, acts upon a traveler 39 by a block housed within what I term a traveler way 40 formed in the cutter carrier 41.

The office of this traveler in its both up and down and lateral travel, is to raise and lower the cutter carrier 41 as an entirety, and in so doing to impart to the moving member 42 of the cutter its up-and-down or in-and-out movement relatively to the fixed member 43 of the cutter.

It is unnecessary to describe in detail the mounting of the cutter carrier and moving cutter, except to say that the moving cutter 42 is retained by a plate 44, and that the cutter carrier 41 travels within suitably mounted and adjusted retaining plates 45 connected with the movable head 30,—and further to say that the fixed cutter 43, in the form shown is provided with a cutting face 46 upon which one end of the bar to be trimmed is adapted to be rested, and that the moving cutter is formed with a convex surface 47 and the fixed cutter with a corresponding concave or channeled groove 48.

The mounting of the fixed cutter with regard to the movable head is such as good shop conditions may dictate,—a cap plate 49 connected by a bolt 50 with a retaining plate 51 on or being a part of the movable head, being a good construction.

It is also unnecessary to explain that the form of cutters may be varied. In fact, every feature with relation to these cutters and their mode of relative operation and action upon the end of a bar to cut it off to a desired outline and to obliquely trim or bevel it, is fully described in my application for patent referred to.

Both the fixed and the movable cutters being attached to the movable head 30, travel with it in its travel within a longitudinal slide-way 52 upon the upper surface of the table frame 2.

The up-and-down stroke of the movable cutter through the connection of the gears 35 and 36 with the gear shaft 7, is unaffected during any period of the rotation of the gear shaft in the operation of the machine, and whatever may be the position of the movable head within its slide-way 52, because, as already explained, the driving gear or bevel pinion 35 is splined on the gear shaft.

In order to set or adjust each of the movable heads to a predetermined desired position relative to the punching and nibbing mechanism or center of the machine, I find it convenient to resort to a screw-shaft 53, mounted in suitable bearings 54 depending from the table frame, which passes through a screw-nut 55 extending downwardly from and connected to the movable head, so that the rotation of the screw-shaft will occasion the travel of the movable head to a given distance either from or toward the punching mechanism.

56 designates a pinion fixed on the end of the screw-shaft 53, which is meshed with a toothed hand wheel 57 turning freely on a spindle or axle 58 fixed to the frame of the machine, by the aid of which hand wheel the movable head is adjusted.

There being two of these screw-shafts relatively operating with the two movable heads, they are provided with opposite threads, so that they will impart opposite movements to the heads with which they are respectively connected.

It will be understood that this construction enables me to adjust the heads so that they will stand apart at equal distances from the punching mechanism, or be set and adjusted at different distances from or toward said mechanism so as to permit of the punching or nibbing of a plate intermediately of its length and at any desired distance nearer to one of its ends than to the other.

*The bar straightening mechanism.*

This mechanism, as already explained, is included within the invention of my pending application referred to.

59 designates a straightening plate or gage-frame which lies upon the upper surface of the table frame 2 and has movement transversely of the length thereof in guideways 60 which house it and permit of its forward and back movement. This plate as to its front face is provided with adjusting or gage blocks 61 which coact with generally correspondent adjusting or gage blocks 62 secured to the table frame.

Between those blocks upon the straightening plate 59 and those upon the table frame, there is a supporting surface 63, being a part of or applied to the upper surface of the table frame, upon which the plate or bar to be operated upon is manually introduced from the front of the machine.

After the bar has been laid upon the supporting surface 63 in such position that its ends bear the desired relation to the cutting mechanisms then assumed to be adjusted to their desired relative positions, and its intermediate portion such relation to the punching mechanism as also desired,—its straightening out is effected by the moving forward of the straightening plate 59 until the bar is clamped between the gage blocks upon said straightening plate and those upon the table frame.

In order to adapt the straightening devices for adjustment to bars of different breadths, the adjusting blocks 61 and 62 are provided with liners 64 of any usual character, and clamped, applied or connected with the blocks by such fastening devices, for instance, as the screws 65.

The forward and back movement of the straightening plate 59 is conveniently accomplished by the cams 21, 22, 23 and 24 on the cam shaft 19 which make contact with the cam rollers 66, 67, 68 and 69 on the straightening plate.

The rotation of the cam shaft is stopped or started by any desired form of clutch adapted to connect or release the two members of which said shaft is shown as composed.

I find it convenient to employ a clutch of the type represented, in which a rocking bar 70 pivoted at 71 and inclined at its outer end, is adapted as to its outer end to be raised or lowered by a treadle 72,—controlled for its return to normal by a return-spring 82,—through the intervention of a lifting rod 73 connected with the rear end of the treadle and extending upward to the rocking bar.

This rocking bar extends between two clutch collars 74 and 75 on the cam shaft, and its inclined outer end is adapted when drawn down by the treadle, to encounter a spring-controlled inclined clutch lug 76 within the collar 75,—the outwardly extending bolt 77 of which clutch lug, under the stress of the inclosed spring 79, is normally within the bolt socket 78 in the clutch collar 74,—and so to throw in the clutch lug, compressing its spring and freeing its bolt from the socket in the collar 74.

That member of the divided cam shaft which carries the cams 21 to 24 which operate upon the straightening plate 59, when the shaft is unclutched, stops rotating, and so stops the in-and-out movement of said plate, which, in the forward direction, as explained, is occasioned by the action of the cams 21 to 24 upon the cam rollers 66 to 69, and in the rearward direction is occasioned by the action of return springs 80 which are connected with a plate or lugs 81 on said straightening plate.

After the depression of the treadle to effect the clutching operation, the unclutching operation will upon the release of the treadle be effected by the expansion of the return spring 82 upon the lifting rod.

This stoppage of the cam shaft is intended to take place after the bar has been straightened and acted upon by the cutting dies and the punching or nibbing mechanism.

*The punching or nibbing mechanism.*

This mechanism, as already explained, is included within the invention of my pending application referred to.

83 designates a vertically movable frame which I term the punch-frame, mounted in guide-ways 85 in a housing 84 of any preferred construction and erected upon the table frame preferably mid-way of its length. The base 86 of the housing, as shown in Fig. 1, is laterally beveled and mounted in transverse guideways 87 on the table frame, so that the housing and the punch frame can together be adjusted forwardly or rearwardly of the table frame.

Connected with the punch frame in any preferred manner is the punch or nibbing bar 88 which punches or nibs the plate. This bar may be of any preferred character and adapted with relation to the punch-frame by any work shop expedient.

Figure 2:
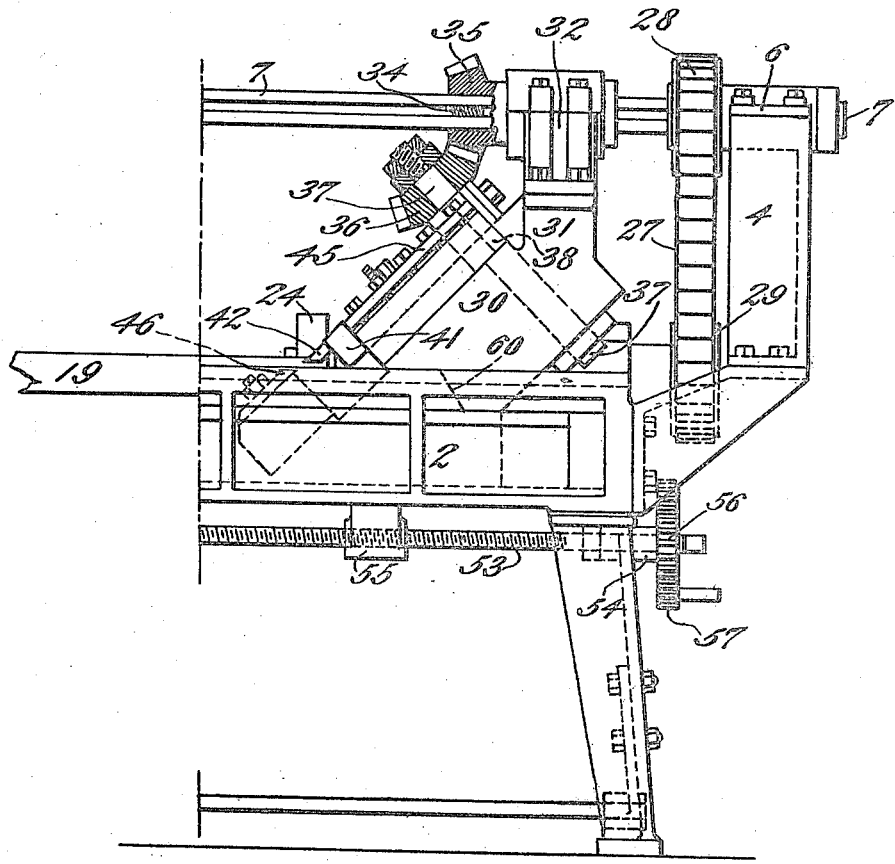
Figure 11:
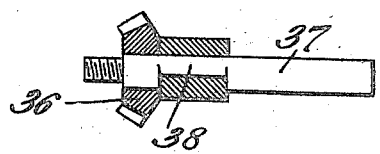
Fig. 11 represents a detail of a bevel pinion, driven shaft and crank shaft which operate a moving cutter.

In the construction illustrated, the punch in its descent drives into a punch hole 89 in what I term an anvil die 90 superimposed upon the table frame, which, as illustrated in Fig. 1, is preferably held in place by means of set screws 91, so as to make it possible to employ dies of different sizes to correspond to punches of different sizes and formations.

The anvil die may be made to conform to a nibbing die instead of to a punch.

In order to actuate the punch-frame and punch to vertical reciprocation, I find it convenient to employ the following-actuating means:—

92 is a segment rocker, being a bar pivoted at 93 to the housing of the punch-frame, and at its forward end formed into or provided with a toothed segment 94 the teeth of which are engaged with a rack 95 on the rear face of the punch-frame 83.

At its rear end the rocker is pivoted at 96 to the bifurcated end 100 of the arm 97 of an eccentric strap 98 which encircles the eccentric 99 keyed on the cam shaft 19, which in its rotation obviously occasions the rotation of the eccentric and, through said eccentric and eccentric strap, the actuation of the segment rocker.

The foregoing devices to operate the punching mechanism may, of course, be varied in construction, those described being simply well adapted from a mechanical viewpoint to accomplish the desired result.

The operation of the machine so far as it has not already been described, may be stated to be as follows:—

Assume a plate or bar P, Fig. 13, to have been placed upon the supporting surface 63 of the table frame against the fixed gage blocks 62,—and assume, further, that the two movable heads 30 of the cutting mechanisms have been adjusted relatively to each other to the respective longitudinal distances from the punch which it is desired that they should occupy,—that is either both equally distant from the punch or one nearer the other,—the ends of the plate will then lie upon the cutting faces 46 of the two fixed cutters.

In this position of the plate, the cutters being adjusted to cut it to its desired ultimate length,—the first action of the machine, when started, will be to cause the forward movement of the straightening plate, under the actuation of the cams 21 to 24 against the cam rollers 66 to 69 upon it, which will cause the adjusting or gage blocks 61 on said straightening plate to encounter the inner longitudinal edge of the plate and straighten it with respect to the fixed gage blocks.

This straightening having been accomplished, the cutters of the cutting mechanisms and the punch of the punching mechanism will then be brought into action to accomplish their respective purposes, at the instant of the completion of the straightening of the plate and practically simultaneously with it.

The relative movements of the straightening mechanism and the punching mechanism will be effected sumultaneously by the appropriate adjustment or timing of the cams on the cam shaft,—and the operation of the cutters to outline and obliquely trim both ends of the plate, will be effected simultaneously therewith, by the prime moving and connecting mechanism which directly operates the cutting mechanisms, the straightening mechanism and the punching mechanism, as already described.

It is within the skill of the work-shop to so calculate the teeth of the various gears, select specific devices for the connections of the shafts, and, as explained, adjust the timing of the cams, as successfully and positively to accomplish the desired result.

The prime moving and connecting mechanism which I have illustrated and described is well adapted, from a mechanical viewpoint, to effect the results which it is assembled to accomplish. Obviously, however, other mechanisms of generally equivalent character may be substituted for it.

Reference to Figs. 13 to 18 inclusive of the drawings, will indicate the effect produced upon the plate by the cutting mechanisms and the punching mechanism, and from them it will be understood how the end of the plate which I have marked P, and the hole marked P$^2$, or the nib marked P$^3$, are formed. The end P' of the plate, as shown in Fig. 15, is left as a scrap or cut-off fragment upon the cutting face 46 of the fixed cutter, while the obliquely cut and outlined edge or end of the plate will be wiped down, so to speak, into the channel 48, smoothed to the desired degree of smoothness, and left without any such thing as resulted from the operation of machines in use prior to the invention of the trimming machine which forms the subject of my Patent No. 1,164,337 referred to. The operation upon both ends of the plate is, of course, the same as to each of the ends.

It is unnecessary in this application to refer to the facts recited in my patent referred to, that although a good construction of the cutting mechanism is one in which one of the die members is fixed and the other movable, yet that the result of the outlining and trimming of the ends of the plate would be equally well accomplished if both were movable, or if their positions were transposed and the recessed die or concave member were made the movable member, and the outwardly rounded die or convex member made the fixed member.

It will now be apparent that I have devised a novel and useful trimming machine, which embodies the features of advantage enumerated as desirable in the statement of the invention and the above description, and that while I have, in the present instance, shown and described a preferred embodiment thereof which will give in practice satisfactory and reliable results, it is to be understood that such embodiment is susceptible of modification in various particulars without departing from the spirit or scope of the invention as set forth in the claims or sacrificing any of its advantages.

Having thus described my invention, what I claim as new and desire to secure by Letters Patent is:—

1. In a machine for simultaneously obliquely trimming both ends of a spring plate or bar, the following elements in combination, namely:—a pair of duplicate and oppositely-counterpart cutting and trimming mechanisms each provided with a pair of cutting dies adapted simultaneously to cut off and obliquely trim both ends of a bar,—a carrying table upon which said cutting and trimming mechanisms are mounted and adapted to have longitudinal movement to variable distances from or toward each other and also with reference to the center of said table,—means for moving and adjusting said cutting and trimming mechanisms to variable distances with reference to each other and also to the center of said carrying table,—and mechanism for occasioning the simultaneous operation of the pairs of cutting dies of each of said cutting and trimming mechanisms after said mechanisms have been fixedly adjusted with relation to each other.

2. In a machine for simultaneously obliquely trimming both ends of a spring plate or bar, the following elements in combination, namely:—a pair of duplicate, oppositely angular and oppositely-counterpart cutting and trimming mechanisms each provided with a pair of cutting dies adapted simultaneously to cut off and obliquely trim both ends of a bar,—a carrying table upon which said cutting and trimming mechanisms are mounted in opposite angular relationship, and adapted to have longitudinal movement to variable distances from or toward each other and also with reference to the center of said table,—means for moving and adjusting said cutting and trimming mechanisms to variable distances with reference to each other and also to the center of said carrying table,—and mechanism for occasioning the simultaneous operation of the pairs of cutting dies of each of said cutting and trimming mechanisms after said mechanisms have been fixedly adjusted with relation to each other.

3. In a machine for simultaneously obliquely trimming both ends of a spring plate or bar, the following elements in combination, namely:—a pair of duplicate, oppositely angular, and oppositely-counterpart cutting and trimming mechanisms each provided with a movable cutting die having a convex under face, with means for actuating said die, and with a fixed die having a concave cutting face, a longitudinally extending concave portion and a rearwardly extending angular face adapted to receive the bar,—a carrying table upon which said cutting and trimming mechanisms are mounted in opposite angular relationship and adapted to have longitudinal movement to variable distances from or toward each other and also with reference to the center of said table,—means for moving and adjusting said cutting and trimming mechanisms to variable distances with reference to each other and also to the center of said carrying table,—and mechanism for occasioning the simultaneous operation of the pairs of cutting dies of each of said cutting and trimming mechanisms after said mechanisms have been fixedly adjusted with relation to each other.

4. In a machine for simultaneously obliquely trimming both ends of a spring plate or bar, the following elements in combination, namely:—a pair of duplicate, oppositely-angular, and oppositely-counterpart cutting and trimming mechanisms each provided with a movable cutting die having a convex underface, with means for actuating said die, and with a fixed die having a concave cutting face, a longitudinally extending concave portion and a rearwardly extending angular face adapted to receive the bar,—a carrying table upon which said cutting and trimming mechanisms are mounted in opposite angular relationship and adapted to have longitudinal movement to variable distances from or toward each other and also with reference to the center of said table,—means for moving and adjusting said cutting and trimming mechanisms to variable distances with reference to each other and also to the center of the carrying table,—and mechanism for occasioning the simultaneous operation of the pairs of cutting dies of each of said cutting and trimming mechanisms after said mechanisms have been fixedly adjusted with relation to each other.

In witness whereof I have hereunto signed my name to this seventh day of January, 1916.

WILLIAM EVANS.

In the presence of—
J. BARSALL TAYLOR,
C. D. McVAY.

Copies of this patent may be obtained for five cents each, by addressing the "Commissioner of Patents. Washington, D. C."